United States Patent Office 3,556,817
Patented Jan. 19, 1971

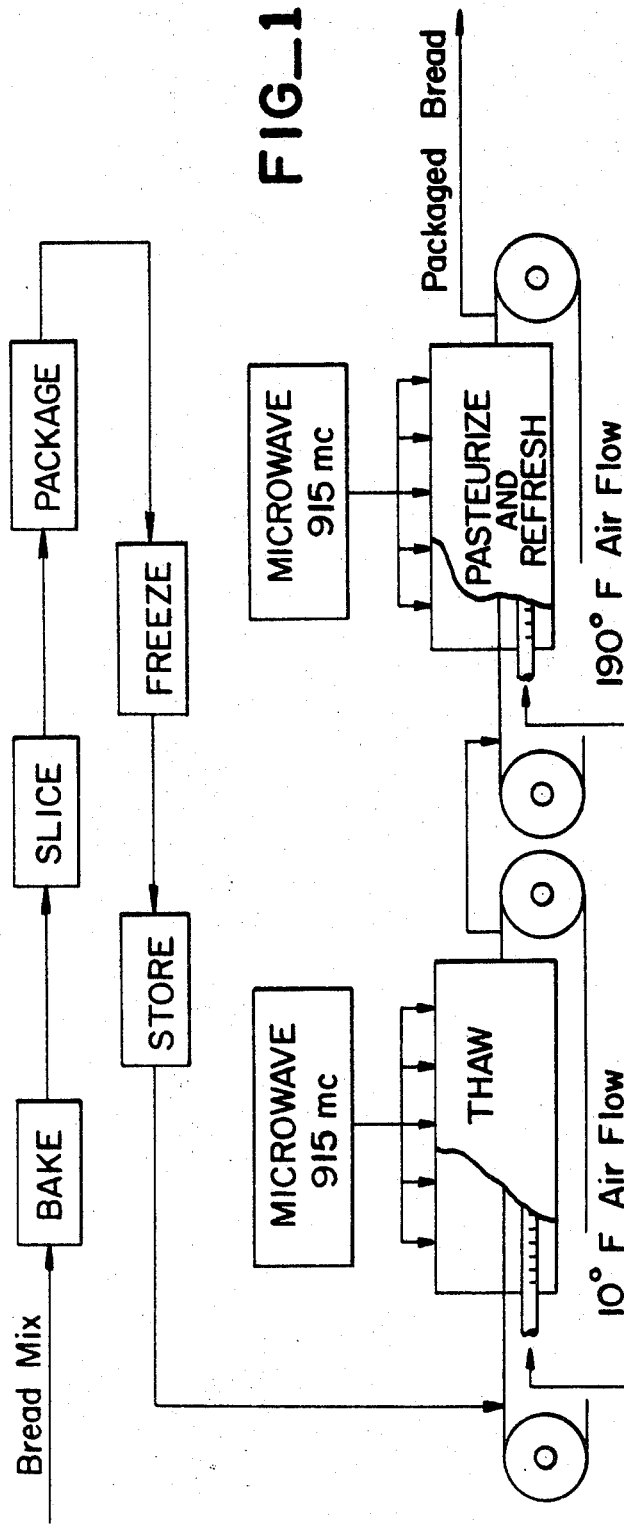
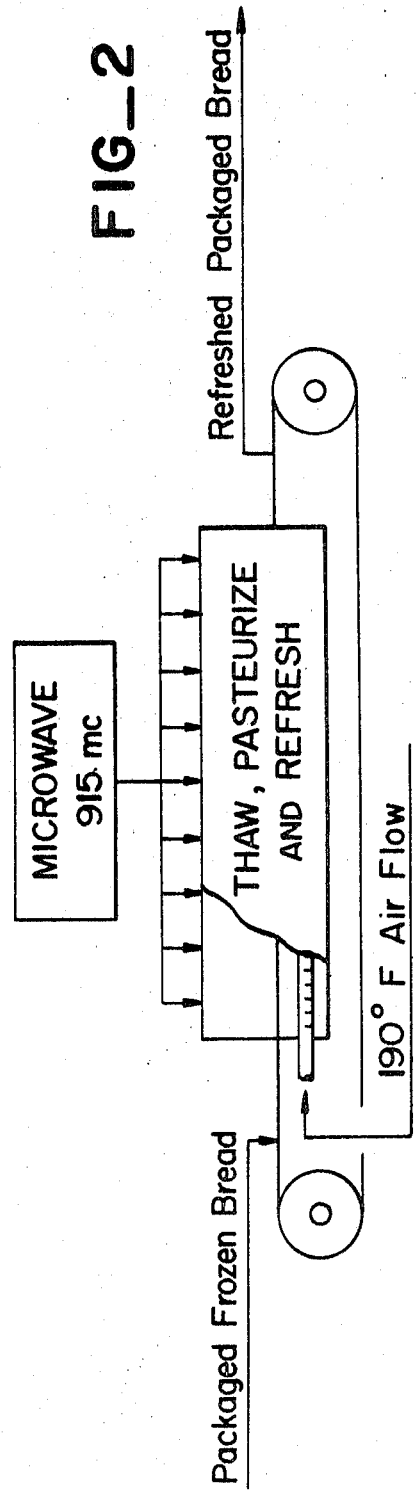

3,556,817
METHOD FOR PROCESSING BAKERY PRODUCTS
Morris R. Jeppson, Danville, Calif., assignor to Cryodry Corporation, San Ramon, Calif., a corporation of California
Filed Mar. 1, 1968, Ser. No. 709,666
Int. Cl. A21d 15/00
U.S. Cl. 99—192                                   6 Claims

ABSTRACT OF THE DISCLOSURE

Packaged fresh bread or the like is preserved by freezing and subsequently thawed, pasteurized and refreshed for consumption by microwave irradiation in the presence of a controlled atmosphere. The atmosphere may be programmed to be cool during the thawing step and is hot during the pasterurizing and refreshing step to avoid adverse effects which might otherwise occur during the microwave treatment.

---

This invention relates to the processing of bakery products and more particularly to a method for preserving packaged bread or the like by freezing and subsequently restoring characteristics of a freshly baked product thereto.

The efficiency of centralized high volume production and distribution of food products is greatly dependent upon the availability of techniques for storing the product prior to marketing. Food products must often be transported for considerable distances and distribution may be further complicated in that the product may be subject to uneven demand thereby requiring that reserve supplies be maintained at some point in the distribution system. Many foods are relatively resistant to spoilage and do not pose serious problems in this connection. Many other foods are relatively easily preserved by a variety of techniques known to the art such as canning, drying, freezing or other steps.

These techniques have not heretofore been satisfactory for the handling of bread and related bakery products. As consequence, current methods for handling bread and the like are relatively inefficient and subject to several vexing problems.

A basic adverse factor in the commercial production and distribution of bread is the well known phenomenon of staling. In a very short period, typically not more than one day, bread loses many of the characteristics of the fresh baked product and takes on taste and texture properties which are undesirable to the consumer. Staling is not markedly inhibited by conventional preservative treatments, other than freezing, and is unfortunately most pronounced at ordinary room temperatures. Owing to the staling problem, the baking industry has been forced to operate under handicaps which are absent from most commercial operations including most kinds of food processing. In particular, a bakery often must operate night shifts, make very frequent deliveries to retail outlets and is unable to build an inventory for meeting demand peaks. One practical consequence is that a commercial bakery must of necessity over-produce and must generally accept returns of unsold stale bread.

Staling of bread and the like is inhibited by subfreezing temperatures and thus the several problems discussed above can be resolved if this particular preservative treatment can be utilized in connection with the distribution of bread. Owing to a further problem, this has not heretofore been feasible. The basic difficulty has been that freezing in turn requires thawing. In order to thaw a frozen bread product by known techniques, it is necessary that it be kept at a temperature range at which staling is pronounced for a period of several hours. Thus the ultimate end product, if conventional techniques are utilized, is again a stale bread.

The present invention makes it practical to store fresh packaged bread by freezing by providing a technique for thawing the frozen bread without excessive staling. The invention further provides for pasterurizing the product thereby enhancing shelf life and simultaneously refreshes the bread to increase attractiveness to the consumer. In particular, the thawing, pasteurizing and refreshing is accomplished by microwave irradiation of the frozen packaged bread and by controlling the temperature of the environment around the bread during at least a portion of the microwave irradiation period to avoid adverse effects which might otherwise occur.

By this means thawing is accomplished very rapidly to produce a product closely resembling fresh bread. Under some conditions the product may in fact have a desirable property which is lacking in most commercial bakery products. In particular, it is sometimes possible to dispense with certain of the chemical additives which are customarily used to enhance shelf life but which have some adverse effects on taste.

Accordingly, it is an object of the invention to facilitate the commercial preparation and distribution of bread products and the like.

It is another object of the invention to provide a practical technique for preserving bread products by freezing while providing for desirable taste and texture characteristics of fresh bread.

It is still another object of the invention to provide a method for thawing, pasteurizing and refreshing frozen packaged bread with minimized staling thereof.

The invention, together with further objects and advantages thereof, will best be understood by reference to the following description in conjunction with the accompanying drawings, of which:

FIG. 1 is a process diagram illustrating the preparation, storage and reconstitution of bread in accordance with the invention under conditions requiring a variation of environment temperature during the microwave irradiation period; and FIG. 2 is a process diagram illustrating a variation of the invention in which the microwave treatment is conducted under a single set of process conditions.

Referring now to FIG. 1, the invention was developed to facilitate the commercial production and distribution of packaged sliced bread and will be herein described with reference thereto. However, it will be apparent that the process is also applicable to other bread-like products such as rolls, buns, some cakes and other related bakery products which are subject to staling if stored at normal temperatures.

Although the bread may be prepared from a conventional mix and may be baked, sliced and packaged in the conventional manner, the invention is adaptable to certain desirable variations in these steps. As indicated above, for example, it is sometimes feasible to eliminate or reduce some of the additives such as calcium propionate which have heretofore been used to inhibit staling but which may adversely effect the quality of the bread. Another variation from the conventional baking process which is facilitated by the invention is that of utilizing microwave energy during the finish baking period. A conventional hot air oven naturally cooks bread slowly and from the outside in. If one attempts to increase the production rate of the oven by increasing the temperature and decreasing process time, the crust tends to get too dark and hard while the center is insufficiently baked. By irradiating the bread with microwave energy in conjunction with the conventional hot air baking, heat is produced directly within the interior of the bread and very rapid baking is achieved. The reason that the process of the present invention may be particularly suited for this technique is that the necessary microwave equipment may already be present for the purpose of carrying out the further steps to be hereinafter described.

Heretofore it has been necessary to distribute and retail the bread product very rapidly after baking, slicing and packaging, in order that it reach the consumer with minimum staling. To avoid this requirement, and the several difficulties attendant thereon, the present process provides for freezing the packaged bread more or less immediately after preparation. The bread may then be stored at freezing temperatures, preferably below about 0° F. for periods ranging up to several months. Depending on circumstances, this refrigerated storage may take place at the bakery or near the retail outlets and may be continued during distribution of the product between the bakery and the retailer by utilizing refrigerated trucks or the like. Thus the invention provides for far more flexibility in the distribution and marketing of bread products than has heretofore been feasible.

The practical use of freezing as a means for preserving baked bread products has heretofore been forestalled because of the time required to thaw the product using conventional means. Conventional thawing requires a minimum of several hours during which staling is inevitably present and is in fact accelerated because the thawing temperature is necessarily close to that at which staling is maximized.

Moreover, conventional thawing does not effect certain further results which are desirable and in some cases necessary. An important factor is that freezing followed by conventional thawing does not accomplish a pasteurizing of the bread. It might appear at first consideration that sterilization would be achieved where the bread is baked at a high temperature, particularly if microwave is employed, and then packaged in a sealed container. This is not the case in practice as the bread must be cooled after baking in order that slicing and packaging may be accomplished. This introduces the risk of bacterial contamination. In addition, the several bread molds will not propagate while the bread is frozen but the spores remain viable and molding will promptly recommence after thawing in the absence of a killing of the spores at some point in the process between baking and marketing. Conventional thawing in a hot air chamber does not inhibit the growth of either bacteria or molds and since the product is sealed in a package there is little that can be done except to expedite the retailing and consumption of the bread.

Still another highly significant factor is that a frozen bread product thawed by conventional means does not closely resemble the fresh baked product. Various physical and chemical phenomena are believed to contribute to this effect. There has necessarily been a change in the condition of the moisture within the bread during freezing and storage and some staling has occurred under the best circumstances. The conventionally thawed bread lacks crispness, aroma, texture and other characteristics which the consumer associates with the fresh product.

The present invention provides for operations following freezing and storage which resolve each of the problems discussed above and for the first time make it practical to utilize frozen storage in conjunction with the large scale commercial distribution of bread products. This is accomplished by thawing, refreshing, and pasteurizing the bread by microwave irradiation wherein a controlled temperature environment, preferably a gas flow, is maintained around the outside of the package during at least a portion of the microwave treatment period.

Considering first the thawing phase of the process in more detail, the unique advantage of microwave heating for this purpose is speed and the fact that heat is generated directly throughout the volume of the bread rather than being applied to the surface and conducted inward. Complete thawing can typically be accomplished in periods of less than three minutes and often in less than one minute as opposed to several hours for conventional hot air thawing. In order to successfully utilize microwave for this purpose, several unique and difficult problems must be resolved.

A first important point is that the frozen bread should be of a uniform temperature throughout as it enters the microwave treatment region. If there is a sizable temperature differential within the bread a destructive runaway condition may develop under microwave irradiation. The basic problem involved is that the loss factor, which determines the rate of absorption of microwave energy, is markedly different for liquid water as opposed to water in the frozen state. A microwave field couples to liquid water several hundred times more strongly than it couples to ice. Consequently, if there is a temperature difference within different regions of the bread, the warmer region will be thawed before the colder region and once the water content of the warmer region is unfrozen it will be much more intensely heated. The practical consequence is a destructive burning of the warmer region while the remaining portion of bread remains unthawed. This condition can easily develop if the frozen bread is exposed to a warm environment for any sizable length of time prior to the microwave thawing step. Under these circumstances, the surface regions of the bread will tend to be warmed somewhat relative to the interior thereof. Consequently, it is desirable that bread remain in frozen storage for a sufficient period of time to assure a fairly uniform temperature distribution and that it be passed rapidly from the frozen storage environment to the microwave region when thawing is to be accomplished.

For similar purposes, it may be necessary to maintain a cool or cold atmosphere around the surface of the bread during the microwave thawing treatment. Under some conditions, sufficient heat may be transferred to the surface region of the bread from the external environment during thawing that the uneven microwave heating and damaging surface effects described above may occur. The possibility of occurence of this effect is dependent upon several factors such as the initial temperature of the bread, the heat transfer properties of the package, etc. but is primarily determined by the thawing time. If the available microwave power input capacity is adequate to thaw the bread in periods of one minute or less, no significant difficulty is usually encountered. With this very short thawing time, the environment around the bread package may in fact be hot as will hereinafter be discussed in further detail. However where an undesirable degree of heating of the surface of the bread does tend to occur, because of the relatively long thawing time or other causes, the effect may be counteracted by maintaining a continuous flow of cool air or other cool gas past the packaged bread during the thawing period. The temperature of the gas flow may range downward from room temperature by an amount dependent on the severity of the problem. In some cases, the gas flow must be well below the freezing temperature of water to avoid premature thawing of the surface region of the bread but should not be so cold that the desired thawing of the bread as a whole is inhibited. Typically the gas flow during the thawing operation, where excessive heat transfer to the bread surface might otherwise cause adverse effects, has a temperature ranging from about 70° F. (normal room temperature) down to below 0° F., a gas temperature of 10° F. being suitable in many cases.

Still another very significant factor relative to the thawing step is the frequency of the microwave energy. The term microwave as herein employed refers to electromagnetic wave energy in the frequency range from about 400 megacycles to about 20,000 megacycles, corresponding to wavelengths from about 30 inches to about one inch. Within this range of frequencies, governmental regulations in the United States of America presently limit industrial microwave operations to one of two specific frequencies, 915 megacycles and 2450 megacycles. It should be understood that absolute frequency control is generally impractical and some slight deviation about these mean frequency values is normal. Of these two assigned frequencies, I have found that the thawing of frozen bread is much more uniformly and effectively accomplished by utilizing 915 megacycles. The basis of this is believed to be that 915 megacycle energy is less strongly absorbed by the water content of the bread and therefore penetrates more completely to achieve a more uniform heating. In any case, the runaway heating effect at the surface of the thawing bread as described above is more likely to occur at the higher frequency.

While a variety of equipment can be adapted to the thawing step described above, it is generally more efficient to utilize a microwave oven of the continuous process type in which the frozen bread is carried through a microwave irradiation region on a belt or the like, and which has provisions for the distributed injection of the microwave along the path of travel of the bread. Further, it may be necessary that the microwave oven be provided with means for maintaining the desired cold atmosphere, preferably by establishing a continuous gas flow within the microwave region. The cold atmosphere should also preferably be provided for by a distributed ejection of the gas along the path of travel of the bread so that there is not a progressive warming of the gas in passage from one region of the microwave oven to the other. A continuous process microwave and controlled gas flow apparatus embodying all of these desirable features is disclosed in copending application Ser. No. 604,106 of the present inventor, filed Nov. 28, 1966 now U.S. Pat. No. 3,409,447, and entitled "Method and Apparatus For Treating Food Products and the Like With Microwave Energy."

Following thawing, the bread is pasteurized and refreshed prior to sale to the consumer. In accordance with the invention, this is accomplished in a second microwave heating period at which the bread is raised to a temperature sufficient to kill bacteria and mold spores without excessively cooking the bread. To achieve an acceptable sterilization, it is usually necessary to heat the bread throughout to a temperature above about 140° F. and preferably to around 170° F. This will typically require microwave irradiation times, additional to that required for thawing, of the order of from 20 seconds to 100 seconds. The slight cooking action which accompanies this pasteurizing operation has the further effect of refreshing bread and restoring properties thereto which closely resemble those of the fresh baked product. The pasteurizing and refreshing step also requires a controlled temperature environment in conjunction with the microwave irradiation.

In the absence of corrective procedures, successful pasteurizing and refreshing by microwave irradiation may be defeated by the condensation of moisture on the inside of the cold package. This tends to make the crust soggy and may soften wax wrappers or otherwise damage the package. This is avoided in the present process by conducting the microwave heating within a controlled environment which at this stage of the process may be a gas flow having a temperature higher than that within the bread itself. If, for example, the maximum temperature attained within the bread is of the order of 140° F. then an exterior gas flow at a temperature in excess of about 150° F. avoids adverse effects. If the bread reaches a temperature of 170° F. then a maximum gas flow temperature of about 190° F. may typically be employed. As in the thawing step, it is desirable to utilize a microwave frequency of about 915 megacycles to take advantage of the more uniform distribution of the microwave field through the product and the consequent more uniform heating.

The apparatus utilized for the pasteurizing and refreshing step may be similar to that used for the thawing step except insofar as the temperature of the air flow may be changed as discussed above. In FIG. 1 of the accompanying drawings, the thawing step is shown as accomplished in a first continuous process microwave oven and the pasteurizing and refreshing step is shown as performed in a second essentially similar oven. This tandem arrangement of separate microwave ovens is in many cases the preferable technique. However, it will be apparent that a single microwave oven may be utilized. Using a single oven, the bread is thawed during a first passage through the microwave region, in the presence of a cool gas flow if necessary, and then is recycled through the same oven for pasteurizing and refreshing with the air temperature being maintained at least as hot as the interior of the bread at any given time as described above. It will also be apparent that a single compartmentalized oven may be utilized having a cold gas flow at a first portion for thawing purposes and a hot gas flow in a second portion for pasteurizing and refreshing. In a batch process microwave oven, the gas temperature may be increased at the appropriate point in the microwave irradiation period.

As has been pointed out above, the availability of a sufficiently high microwave power input capacity may provide for thawing in a time sufficiently short that it is unnecessary to be concerned about the temperature of the environment around the package during the thawing step. Under this condition, the thawing and the pasteurizing and refreshing phases of the process may be performed as effectively one continuous step. Thus, as illustrated in FIG. 2, a packaged frozen bread is passed through a single microwave treatment region in the presence of a gas flow which is maintained at the high temperature corresponding to that required for the pasteurizing and refreshing step as hereinbefore described.

Following processing as described above, the bread has been reconstituted to a condition closely resembling that of the fresh baked product and may then be handled in the customary manner. At this point, the bread will exhibit a shelf life approaching that of bread fresh from the bakery insofar as staling is concerned. Thus, under normal quality standards, one or two days are available following the pasteurizing and refreshing step for final distribution to the consumer. In the case of those bread products having a shelf life which is limited by molding rather than staling the shelf life following processing in accordance with the invention is greater than for the fresh baked product. This results from the killing of mold spores during the pasteurizing and refreshing step. Many dark breads, brown and serve rolls, and English muffins are bread products having a shelf life limited primarily by mold growth rather than by staling.

Considering now one example of the practice of the invention, seven loaves of packaged bread were frozen and stored at a temperature of −4° F. Thawing was accomplished by transferring the loaves immediately from the subfreezing storage environment to a conveyorized microwave oven of the type described in the hereinbefore identified co-pending application Ser. No. 604,106, the loaves being introduced into the microwave oven at intervals of 30 seconds. Transit time of each loaf through the active microwave region was approximately 40 seconds. The microwave oven operated at 915 megacycles with a power input of 5 kilowatts, the air within the oven being at approximately 70° F. The loaf temperature following the thawing step was found to be approximately 32° F.

The loaves were then pasteurized and refreshed by a second passage through the microwave oven in the presence of the flow of air at 200° F. Transit time through the active microwave region during the second passage was approximately 20 seconds. Immediately after completion of the pasteurizing and refreshing step, the loaves were found to have an interior temperature of approximately 150° F. near the ends and approximately 163° F. at the warmest point in the centers of the loaves. No condensation of moisture on the inside of the package was observed and the loaves exhibited the taste, texture and aroma of freshly baked bread.

While the invention has been described with respect to specific sequences of steps and preferred process conditions, it will be apparent that variations are possible within the scope of the invention and it is not intended to limit the invention except as defined in the following claims.

What is claimed is:

1. A method of thawing a frozen bread product or the like utilizing a microwave oven, said method comprising subjecting the product to microwave energy in the microwave oven, and forcing gas at a relatively low temperature into the oven and about the product, the temperature of the gas being sufficiently low to prevent thawing of the surface regions of the product prior to thawing of the interior thereof.

2. The method defined in claim 1 wherein said microwave energy has a frequency of about 915 megacycles.

3. In a method for preserving bread products and the like, the steps comprising: freezing said bread products; storing said product at subfreezing temperature; thawing said bread product by microwave irradiation in an environment having a temperature established by passing a gas flow around said product, said gas flow having a temperature sufficiently low to prevent significant heat transfer to the surface of said product from said environment; and subsequently pasteurizing and refreshing said bread product by microwave irradiation in a hot environment.

4. The method defined in claim 3 wherein said microwave irradiation has a frequency of about 915 megacycles.

5. The method defined in claim 3 wherein said hot environment during said pasteurization and refreshing steps is established by passing a gas flow around said product.

6. In a method for treating a frozen bread-like product the step of: thawing said product by microwave irradiation in an environment having a temperature established by passing a gas flow around said product, said gas flow having a temperature sufficiently low to prevent substantial heat transfer to the surface of said product from said environment.

References Cited

UNITED STATES PATENTS

| | | | |
|---|---|---|---|
| 2,355,887 | 8/1944 | Moule | 99—221UX |
| 2,895,828 | 7/1959 | Kamide | 99—221X |
| 3,263,052 | 7/1966 | Jeppson et al. | 99—221 |
| 3,321,314 | 5/1967 | Jeppson | 99—221 |

FOREIGN PATENTS

| | | | |
|---|---|---|---|
| 888,518 | 1/1962 | Great Britain | 99—192 |

OTHER REFERENCES

Roberts: Proceedings of the Thirty-fifth Annual Meeting of the American Society of Bakery Engineers, 1959, pp. 271–275, "Use of Sound Waves, etc.," 99–221.

Story: "Electronics," August 1948, pp. 67, 68, 69, 86, 99–221.

Jeppson: "Consider Microwaves," Food Engineering, November 1964, pp. 49–52, 99–221.

Olsen: "Microwaves Inhibit Bread Mold," Food Engineering, July 1965, pp. 51–53.

TIM R. MILES, Primary Examiner

U.S. Cl. X.R.

99—221, 233, 253, 274